US011299571B2

(12) United States Patent
Liu et al.

(10) Patent No.: US 11,299,571 B2
(45) Date of Patent: Apr. 12, 2022

(54) AQUEOUS POLYMER COMPOSITION

(71) Applicants: Dow Global Technologies LLC, Midland, MI (US); Rohm and Haas Company, Collegeville, PA (US)

(72) Inventors: Han Liu, Shanghai (CN); Junyu Chen, Shanghai (CN); Yaguang Zhao, Shanghai (CN); Xiangting Dong, Shanghai (CN); Qingwei Zhang, Shanghai (CN); Ling Li, Louyang (CN); Yan Luo, Shanghai (CN); Jintao Liu, Shanghai (CN)

(73) Assignees: Dow Global Technologies, LLC, Midland, MI (US); Rohm and Haas Company, Collegeville, PA (US)

( * ) Notice: Subject to any disclaimer, the term of this patent is extended or adjusted under 35 U.S.C. 154(b) by 72 days.

(21) Appl. No.: 16/641,752

(22) PCT Filed: Sep. 26, 2017

(86) PCT No.: PCT/CN2017/103356
§ 371 (c)(1),
(2) Date: Feb. 25, 2020

(87) PCT Pub. No.: WO2019/061011
PCT Pub. Date: Apr. 4, 2019

(65) Prior Publication Data
US 2020/0362079 A1 Nov. 19, 2020

(51) Int. Cl.
*C08F 220/28* (2006.01)
*C08L 33/14* (2006.01)
*C08K 5/3435* (2006.01)
*C08K 5/46* (2006.01)
*C08K 5/56* (2006.01)

(52) U.S. Cl.
CPC ........ *C08F 220/283* (2020.02); *C08K 5/3435* (2013.01); *C08K 5/46* (2013.01); *C08K 5/56* (2013.01); *C08L 33/14* (2013.01); *C08L 2201/54* (2013.01)

(58) Field of Classification Search
CPC ...... C08F 220/283; C08K 5/3435; C08K 5/46
See application file for complete search history.

(56) References Cited

U.S. PATENT DOCUMENTS

| 3,399,080 A | 8/1968 | Vitkuske |
| 3,404,116 A | 10/1968 | Pueschner et al. |
| 4,161,526 A | 7/1979 | Gorman |
| 5,939,203 A * | 8/1999 | Kappock ............... C09K 15/28 428/469 |
| 5,998,543 A | 12/1999 | Collins et al. |
| 6,355,720 B1 | 3/2002 | Canard et al. |
| 7,731,787 B2 | 6/2010 | Amey |
| 8,276,629 B2 | 10/2012 | Bonhomme |
| 2004/0161542 A1 | 8/2004 | Ziemann et al. |
| 2005/0014883 A1* | 1/2005 | Blankenship ......... C08F 265/06 524/458 |
| 2007/0161723 A1 | 7/2007 | McCarthy |
| 2008/0071005 A1* | 3/2008 | Shin ...................... A01N 31/02 523/122 |
| 2008/0194731 A1 | 8/2008 | Herbst et al. |
| 2015/0259559 A1 | 9/2015 | Petrie et al. |

FOREIGN PATENT DOCUMENTS

| CN | 101056926 | 10/2007 |
| EP | 1447432 | 8/2004 |
| EP | 2909266 | 8/2015 |
| JP | 04746248 B2 | 8/2011 |
| JP | 5097945 B2 | 12/2012 |
| WO | 2007079529 | 7/2007 |

OTHER PUBLICATIONS

International Preliminary Report on Patentability for PCT Application No. PCT/CN2017/103356; International Filing Date: Sep. 26, 2017; 4 pages.
Fox, "Influence of Diluent and of Copolymer Composition on the Glass Temperature of a Polymer System," Bull. Am. Physics Soc., 1956, p. 123, vol. 1, No. 3.
Peyser, "Glass Transition Temperatures of Polymers," Polymer Handbook, p. VI/215-VI/227, Interscience Publishers.

* cited by examiner

*Primary Examiner* — Karuna P Reddy
(74) *Attorney, Agent, or Firm* — Karl E. Stauss; Cantor Colburn LLP

(57) ABSTRACT

An aqueous polymer composition comprising an acetoacetoxy functional polymer, a metal pyrithione compound, and TEMPO and/or its derivative, showing less yellowing.

8 Claims, No Drawings

AQUEOUS POLYMER COMPOSITION

FIELD OF THE INVENTION

The present invention relates to an aqueous polymer composition, particularly an aqueous coating composition, and a method for reducing yellowing of coating compositions.

INTRODUCTION

Aqueous coating compositions are becoming increasingly more important than solvent-based coating compositions for less environmental problems. It is often desirable to incorporate biocides (also known as "antimicrobial compounds") into aqueous coating compositions to provide resistance to microorganisms. For example, metal pyrithione compounds, such as zinc pyrithione (ZPT), have been used in aqueous coating compositions as long lasting anti-fungal compounds. However, these biocides may cause yellowing issues when exposing to sunlight. For example, US2007/0161723A1 discloses an antimicrobial paint including an effective amount of one or more UV light absorbers such as a hindered amine light stabilizer ("HALS") able to prevent or reduce a change or destructive effect by UV light on a metal pyrithione. Aqueous coating compositions are also required to have sufficient color stability to resist yellowing during transportation and/or storage.

There is a need to provide an aqueous polymer composition comprising a metal pyrithione compound such as ZPT that shows less yellowing during transportation and/or storage.

SUMMARY OF THE INVENTION

The present invention provides an aqueous polymer composition comprising a novel combination of an acetoacetoxy functional polymer, a metal pyrithione compound, and 2,2,6,6-tetramethyl-1-piperidinyloxy (TEMPO) and/or derivatives thereof.

Research leading to the present invention has revealed that, when used with an acetoacetoxy functional polymer, a metal pyrithione compound causes color (i.e., yellowness) of aqueous coating compositions during storage. Surprisingly, the present invention shows that the use of TEMPO and/or derivatives thereof keeps metal pyrithione compounds from causing yellowness of aqueous polymer compositions comprising the acetoacetoxy functional polymer.

In a first aspect, the present invention is an aqueous polymer composition, comprising:
(a) an acetoacetoxy functional polymer,
(b) a metal pyrithione compound, and
(c) from 0.005% to 1% by weight of TEMPO and/or a derivative thereof, based on the total weight of the aqueous polymer composition.

In a second aspect, the present invention a method for reducing yellowing of an aqueous coating composition comprising an acetoacetoxy functional polymer and a metal pyrithione compound, comprising:
adding from 0.005% to 1% by weight of TEMPO and/or a derivative thereof into the aqueous coating composition, based on the total weight of the aqueous coating composition and TEMPO and/or a derivative thereof.

DETAILED DESCRIPTION OF THE INVENTION

A biocide is a compound that is capable of inhibiting the growth of or controlling the growth of microorganisms. Biocides include, for example, bactericides, bacteristats, fungicides, fungistats, algaecides, and algistats. The term "microorganism" includes, for example, fungi (such as, for example, yeast and mold), bacteria, and algae.

The term "acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g(calc.)$ is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

As used herein, the term structural units, also known as polymerized units, of the named monomer refers to the remnant of the monomer after polymerization. For example, a structural unit of methyl methacrylate is as illustrated:

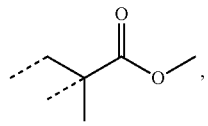

where the dotted lines represent the points of attachment of the structural unit to the polymer backbone.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

The acetoacetoxy functional polymer in the aqueous polymer composition refers to a polymer having at least one pendant acetoacetoxy groups. As used herein, the term "pendant" means "attached to the polymer backbone as a side group, but not within the polymer backbone". The term "pendant" also includes attachment of such a group at the termini of a polymer chain. The acetoacetoxy functional polymer comprises structural units of one or more acetoacetoxy functional monomers. The acetoacetoxy functional monomers are monomers having one or more acetoacetoxy functional groups represented by:

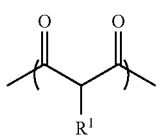

wherein $R^1$ is hydrogen, an alkyl having 1 to 10 carbon atoms, or phenyl.

Preferred acetoacetoxy functional groups include

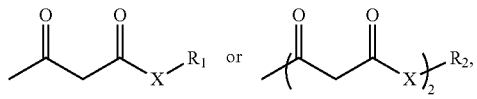

wherein X is O, $R_1$ is a divalent radical and $R_2$ is a trivalent radical, that attach the acetoacetoxy functional group to the polymer backbone.

The acetoacetoxy functional monomer useful in the present invention may be an ethylenically-unsaturated acetoacetoxy functional monomer. Particularly preferred ethylenically-unsaturated acetoacetoxy functional monomers include, acetoacetoxyethyl methacrylate (AAEM), acetoacetoxyethyl acrylate, acetoacetoxypropyl (meth)acrylate, allyl acetoacetate, vinyl acetoacetate, acetoacetoxybutyl (meth)acrylate, 2,3-di(acetoacetoxy)propyl (meth)acrylate, t-butyl acetoacetate, or combinations thereof. The polymer may comprise, based on the weight of the polymer, 0.05% by weight or more, 0.1% by weight or more, 1% by weight or more, 1.5% by weight or more, or even 2% by weight or more, and at the same time, 20% by weight or less, 15% by weight or less, 10% by weight or less, 8% by weight or less, or even 5% by weight or less of structural units of the acetoacetoxy functional monomer.

The acetoacetoxy functional polymer in the aqueous polymer composition may comprise structural units of one or more ethylenically unsaturated ionic monomers. The term "ionic monomers" herein refers to monomers that bear an ionic charge between pH=1-14. The ethylenically unsaturated ionic monomers may include α, β-ethylenically unsaturated carboxylic acids and/or their anhydrides such as, for example, acrylic acid, methyl acrylic acid, crotonic acid, acyloxypropionic acid, maleic acid, fumaric acid, itaconic acid, (meth)acrylic anhydride, maleic anhydride, or mixtures thereof; sulfonate monomers such as sodium styrene sulfonate (SSS) and sodium vinyl sulfonate (SVS); acrylamido-2-methylpropanesulfonic acid (AMPS), and carbonate monomers; or mixtures thereof. Preferred ethylenically unsaturated ionic monomers are selected from the group consisting of acrylic acid, methyl acrylic acid, crotonic acid, acyloxypropionic acid, maleic acid, fumaric acid, and itaconic acid. The polymer may comprise, based on the weight of the polymer, 0.1% by weight or more, 0.2% by weight or more, 0.5% by weight or more, or even 1% by weight or more, and at the same time, 15% by weight or less, 10% by weight or less, 5% by weight or less, or even 4% by weight or less, of structural units of the ethylenically unsaturated ionic monomer.

The acetoacetoxy functional polymer in the aqueous polymer composition may further comprise structural units of one or more ethylenically unsaturated nonionic monomers. The term "nonionic monomers" herein refers to monomers that do not bear an ionic charge between pH=1-14. Suitable examples of the ethylenically unsaturated nonionic monomers include, for example, monoethylenically unsaturated nonionic monomers including alkyl esters of (meth) acrylic acids such as methyl acrylate, ethyl acrylate, butyl acrylate, 2-ethylhexyl acrylate, decyl acrylate, lauryl acrylate, methyl methacrylate, butyl methacrylate, butyl acrylate, isodecyl methacrylate, lauryl methacrylate, hydroxy-functional (meth)acrylic acid alkyl ester such as hydroxyethyl methacrylate, hydroxypropyl methacrylate, or mixtures thereof; (meth)acrylonitrile; (meth)acrylamide; amino-functional and ureido-functional monomers such as hydroxyethyl ethylene urea methacrylate; cycloalkyl (meth) acrylates such as cyclohexyl(meth)acrylate, methcyclohexyl acrylate, isobornyl methacrylate, isobornyl acrylate, and dihydrodicyclopentadienyl acrylate; butadiene; ethylene, propylene, α-olefins such as 1-decene; styrene; vinyl acetate, vinyl butyrate, vinyl versatate or other vinyl esters; or combinations thereof. Preferably, the ethylenically unsaturated nonionic monomers are selected from the group consisting of methyl methacrylate, ethyl acrylate, butyl methacrylate, butyl acrylate, 2-ethylhexyl acrylate, and styrene. The polymer may comprise, based on the weight of the polymer, 65% by weight or more, 75% by weight or more, 85% by weight or more, or even 90% by weight or more, and at the same time, 99.85% by weight or less, 99.7% by weight or less, 98.5% by weight or less, or even 97% by weight or less, of structural units of the ethylenically unsaturated nonionic monomer.

In some embodiments, the acetoacetoxy functional polymer in the aqueous polymer composition comprises, based on the weight of the polymer, from 2% to 8% by weight of structural units of the acetoacetoxy functional monomers, from 1% to 4% by weight of structural units of the ethylenically unsaturated ionic monomer, and from 90% to 97% by weight of structural units of the ethylenically unsaturated nonionic monomer.

The types and levels of the monomers described above for preparing the acetoacetoxy functional polymer may be chosen to provide the polymer with a glass transition temperature ($T_g$) in the range of from −20 to 60° C., from −10 to 50° C., or from −5 to 40° C.

The acetoacetoxy functional polymer in the aqueous polymer composition may be prepared by free-radical polymerization, preferably emulsion polymerization, of the monomers described above. Total weight concentration of monomers for preparing the polymer is equal to 100%. The weight content of each monomer based on the total weight of monomers for preparing the polymer may be substantially the same as the weight content of such monomer as structural units of the polymer based on the weight of the polymer. Conditions of emulsion polymerization are known in the art, for example, U.S. Pat. Nos. 3,399,080 and 3,404,116. Multistage free-radical polymerization can also be used in preparing the acetoacetoxy functional polymer, which at least two stages are formed sequentially, and usually results in the formation of the multistage polymer comprising at least two polymer compositions. The polymerization process typically gives an aqueous dispersion of polymer particles. After completing the polymerization of the acetoacetoxy functional polymer, the obtained polymer may be neutralized by one or more bases as neutralizers to a pH value, for example, from 6 to 10 or from 7 to 9. The obtained polymer particles may have an average particle size of from 50 to 500 nanometers (nm), from 80 to 300 nm, from 100 to 200 nm, or from 110 to 180 nm. The average particle size herein refers to the number (D-90) average particle size as measured by Brookhaven BI-90 Particle Size Analyzer.

The aqueous polymer composition of the present invention may comprise the acetoacetoxy functional polymer in an amount of 3% or more, 6% or more, or even 10% or more, and at the same time, 40% or less, 30% or less, or even 20% or less, by weight based on the total weight of the aqueous polymer composition.

The aqueous polymer composition of the present invention further comprises one or more metal pyrithione compounds. The metal pyrithione compounds may have the structure as shown in formula (I):

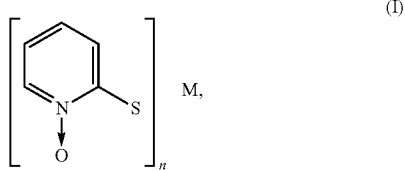

wherein M represents a metal, such as zinc or copper, and n is a valence, and preferably from 1 to 2.

Examples of suitable metal pyrithione compounds include zinc pyrithione, copper pyrithione, or mixtures thereof. Preferred metal pyrithione compound is zinc pyrithione. The aqueous polymer composition may comprise, based on the total weight of the aqueous polymer composition, 0.001% by weight or more, 0.01% by weight or more, 0.05% by weight or more, or even 0.1% by weight or more, and at the same time, 2% by weight or less, 1.5% by weight or less, 1% by weight or less, 0.8% by weight or less, or even 0.5% by weight or less, of the metal pyrithione compound.

The aqueous polymer composition of the present invention also comprises 2,2,6,6-tetramethyl-1-piperidinyloxy (TEMPO) and/or one or more its derivatives. TEMPO and/or its derivatives may have the structure of formula (II),

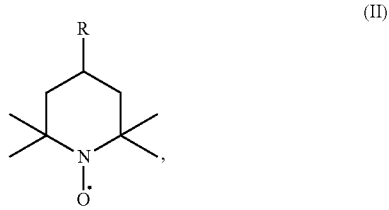

wherein R is H, —OH, an alkyl, an alkoxy, or a (hetero) aryl.

R in formula (II) can be H; —OH; a $C_1$-$C_{26}$, $C_1$-$C_{10}$, or $C_1$-$C_6$ alkyl, and preferably methyl, ethyl, or hexyl; a $C_1$-$C_{26}$, $C_1$-$C_{10}$, or $C_1$-$C_4$ alkoxy, and preferably methoxy, ethoxy, or butoxy; or a $C_5$-$C_{16}$, $C_5$-$C_{10}$, or $C_5$-$C_6$ (hetero) aryl, and preferably phenyl, naphthalenyl, pridinyl, thiophenyl, or furanyl. More preferred R is H or —OH.

Suitable TEMPO and/or its derivatives may include, for example, 2,2,6,6-tetramethyl-1-piperidinyloxy (TEMPO), 4-hydroxy 2,2,6,6-tetramethyl-1-piperidinyloxy (4-hydroxy-TEMPO), 4-methyl 2,2,6,6-tetramethyl-1-piperidinyloxy (4-methyl-TEMPO), 4-ethyl 2,2,6,6-tetramethyl-1-piperidinyloxy (4-ethyl-TEMPO), 4-methoxy 2,2,6,6-tetramethyl-1-piperidinyloxy (4-methoxy-TEMPO), or mixtures thereof. Preferred TEMPO and/or derivatives thereof include TEMPO, 4-hydroxy 2,2,6,6-tetramethyl-1-piperidinyloxy (4-hydroxy-TEMPO), or mixtures thereof. The aqueous polymer composition may comprise, based on the total weight of the aqueous polymer composition, 0.005% by weight or more, 0.008% by weight or more, or even 0.01% by weight or more, and at the same time, 1% by weight or less, 0.8% by weight or less, 0.5% by weight or less, 0.2% by weight or less, or even 0.1% by weight or less, of TEMPO and/or derivatives thereof.

The aqueous polymer composition of the present invention may further comprise pigments and/or extenders. "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. $TiO_2$ may be also available in concentrated dispersion form. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The aqueous polymer composition may have a pigment volume concentration (PVC) of from 5% to 90%, from 10% to 85%, or from 15% to 80%. PVC may be determined according to the following equation:

$$PVC=[Volume_{(Pigment+Extender)}/Volume_{(Pigment+Extender+Binder)}]\times 100\%$$

The aqueous polymer composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers may include, for example, TEGO Airex 902 W and TEGO Foamex 1488 polyether siloxane copolymer emulsions both available from TEGO, BYK-024 silicone deformer available from BYK, or mixtures thereof. The defoamer may be present, based on the total weight of the aqueous coating composition, generally from 0 to 1% by weight, from 0.01% to 0.7% by weight, or from 0.2% to 0.5% by weight.

The aqueous polymer composition of the present invention may further comprise one or more thickeners. The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is a hydrophobically-modified hydroxy ethyl cellulose (HMHEC). The thickener may be present, based on the total weight of the aqueous polymer composition, generally from 0 to 5% by weight, from 0.1% to 2% by weight, or from 0.5% to 1% by weight.

The aqueous polymer composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. The wetting agent may be present, based on the total weight of the aqueous polymer composition, from 0 to 5% by weight, from 0.1% to 2% by weight, or from 0.1% to 1% by weight.

The aqueous polymer composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. Preferably, the aqueous polymer composition is substantially free of sorbate ester or sorbamide coalescents, for example, less than 0.5%, less than 0.4%, less than 0.1%, or even zero of the sorbate ester or sorbamide coalescents, by weight based on the weight of the polymer. The coalescent may be present, based on the total weight of the aqueous polymer composition, from 0 to 10% by weight, from 0.1% to 8% by weight, or from 0.1% to 5% by weight.

The aqueous polymer composition of the present invention may also comprise one or more additional biocides that are different from the metal pyrithione compound described above. Examples of these additional biocides include methylisothiazolinone (MIT), benzisothiazolinone (BIT), isothiazolinones (CMIT), 2,2-Dibromo-2-cyanoacetamide (DBMTA), 2-Octyl-2H-isothiazol-3-one (OIT), or mixtures thereof. The additional biocide may be present, based on the total weight of the aqueous polymer composition, from 0 to 1% by weight, from 0.01% to 0.8% by weight, or from 0.05% to 0.5% by weight.

In addition to the components described above, the aqueous polymer composition of the present invention may further comprise any one or combination of the following additives: buffers, neutralizers, humectants, anti-skinning agents, colorants, flowing agents, anti-oxidants, plasticizers, leveling agents, thixotropic agents, adhesion promoters, and grind vehicles. These additives may be present in a combined amount of from 0 to 10% by weight, from 0.01% to 5% by weight, or from 0.01% to 2% by weight, based on the total weight of the aqueous polymer composition.

The aqueous polymer composition of the present invention may be prepared by admixing the acetoacetoxy functional polymer typically in an aqueous dispersion, the metal pyrithione compound and TEMPO and/or derivatives thereof, and other optional components, e.g., pigments and/or extenders described above. Components in the aqueous polymer composition may be mixed in any order to provide the aqueous polymer composition of the present invention. Any of the above-mentioned optional components may also be added to the composition during or prior to the mixing to form the aqueous polymer composition. When the aqueous polymer composition comprises pigment and/or extender, the pigments and/or extenders are preferably mixed with a dispersant to form a slurry of pigments and/or extender.

The solids content of the aqueous polymer composition of the present invention may be from 10% to 65% or from 25% to 50% by volume.

The aqueous polymer composition of the present invention is useful for various applications where low yellowness is desired. The aqueous polymer composition is particularly suitable as aqueous coating compositions. For example, marine and protective coatings, automotive coatings, traffic paints, Exterior Insulation and Finish Systems (EIFS), roof mastic, wood coatings, coil coatings, plastic coatings, powder coatings, can coatings, architectural coatings, and civil engineering coatings. The aqueous polymer composition is particularly suitable for architectural coatings.

The aqueous polymer composition of the present invention shows less yellowness during storage as compared to the same aqueous polymer composition except for TEMPO and/or its derivatives. "Reduced or low yellowness" or "reduced or low yellowing" may be indicated by lower delta b ($\Delta$b) values after storage as determined by the test method described in the Examples section below, for example, the aqueous polymer composition, upon heat aging at 80° C. for 10 days, shows delta b ($\Delta$b) value of 2.3 or less, 2.2 or less, 2.1 or less, 2.0 or less, 1.5 or less, 1.2 or less, or even 1.0 or less. Surprisingly, the aqueous polymer composition of the present invention can decrease $\Delta$b value by at least 50%, at least 55%, or at least 60%, as compared to an aqueous polymer composition comprising the same amounts of the acetoacetoxy functional polymer and the metal pyrithione compound but without TEMPO and/or its derivatives.

The present invention also relates to a method for reducing yellowing of an aqueous coating composition comprising the acetoacetoxy functional polymer and the metal pyrithione compound described above, comprising adding from 0.005% to 1% by weight of the TEMPO and/or derivatives thereof into the aqueous coating composition, based on the total weight of the aqueous coating composition and TEMPO and/or derivatives thereof. Preferably, the dosage of the TEMPO and/or derivatives thereof is 0.008% by weight or more, or even 0.01% by weight or more, and at the same time, 0.8% by weight or less, 0.5% by weight or less, 0.2% by weight or less, or even 0.1% by weight or less. After adding the TEMPO and/or derivatives thereof into the aqueous coating composition, the resultant polymer composition can be the same as the aqueous polymer composition of the present invention described above. The aqueous coating composition may also comprise one or more components described above in the polymer composition section above, for example, the pigment and/or extenders, the defoamer, the thickener, the wetting agent, the coalescent, and the additional biocide. This method can show reduced or lower yellowness of the resultant polymer composition during storage as compared to that of the aqueous coating composition prior to adding the TEMPO and/or derivative thereof. The reduced or lower yellowness is as described above. For example, the addition of TEMPO and/or derivatives thereof can result in at least 50%, at least 55%, or at least 60% of reduction of $\Delta$b values (after heatage at 80° C.

for 10 days) of coating films made from the aqueous coating composition without addition of the TEMPO and/or derivatives thereof, according to the test method described in the Examples section below.

The aqueous polymer composition of the present invention can be applied to, and adhered to, various substrates. Examples of suitable substrates include wood, metals, plastics, foams, stones, elastomeric substrates, glass, fabrics, concrete, or cementitious substrates. The aqueous polymer composition of the present invention can be applied to a substrate by incumbent means including brushing, dipping, rolling and spraying. The aqueous polymer composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the polymer composition of the present invention has been applied to a substrate, the polymer composition can dry, or allow to dry, to form a film (e.g., a coating) at room temperature (20-25° C.), or at an elevated temperature, for example, from 35° C. to 60° C.

Examples

Some embodiments of the invention will now be described in the following Examples, wherein all parts and percentages are by weight unless otherwise specified.

DISPONIL FES 32 anionic surfactant ("Fes-32") is available from BASF.

Sodium carbonate ($Na_2CO_3$), sodium persulfate (SPS), ammonia persulphate (APS), ferrous sulfate, ethylene diamine tetraacetic acid (EDTA), t-Butyl hydroperoxide (t-BHP), isoascorbic acid (IAA), mono ethanol amine (MEA), sodium hydroxide (NaOH), ferric nitrate, 4-Hydroxy-2,2,6,6-tetramethyl-piperidinooxy (4-hydroxy-TEMPO), and 2,2,6,6-Tetramethyl-4-piperidinol (TMP) are all available from Shanghai Chemical Reagent Co., Ltd.

Ethyl acrylate (EA), Butyl acrylate (BA), methyl methacrylate (MMA), and methacrylic acid (MAA) are all available from Shanghai Lang Yuan Chemical Co., Ltd.

BRUGGOLITE FF6 ("FF6") is a reductant available from Bruggemann Chemical.

Sodium lauryl sulfate (SLS) surfactant is available from BASF.

NATROSOL 250 HBR hydroxyethyl cellulose rheology modifier is available from Ashland Aqualon Company.

Methacryloxyethyl ethylene urea (MEUA), acetoacetoxy ethyl methacrylate (AAEM), OROTAN™ 1288 polyacid copolymer used as a pigment dispersant, TRITON™ EF-406 nonionic surfactant, ACRYSOL™ TT-935 rheology modifier, ROPAQUE Ultra E Opaque polymer, and AQUCAR™ DB 20 microbiocide ("DB 20", a 20% solution of 2,2-dibromo-3-nitrilopropionamide) are all available from The Dow Chemical Company (OROTAN, TRITON, ACRYSOL, and AQUCAR are all trademarks of The Dow Chemical Company).

NOPCO NXZ Defoamer, available from Nopco, is a nonionic silicon oil.

Ti-Pure R-706 pigment, available from DuPont, is titanium dioxide.

CC-700 Extender ("CC-700") calcium carbonate, DB-80 Extender ("DB-80") calcined kaolin clay, and Talc 800 Extender ("Talc-800") washed kaolin clay are all available from Guangfu Building Materials Group (China).

RHODOLINE FT 100 freeze-thaw stabilizer is available from Solvay.

TEXANOL coalescent, avaialbe from Eastman Chemical Company, is trimethylpentanediol isobutyrate.

Zinc pyrithione (ZPT) and copper pyrithione (CuPT), both available from Sinopharm Chemical Reagent Co., Ltd., are used as biocides.

Methylisothiazolinone (MIT) and benzisothiazolinone (BIT), both available from The Dow Chemical Company, are used as biocides.

EVERSORB AQ-1 ("AQ-1") and AQ-4 ("AQ-4") hindered amine light stabilizers (HALS), both available from Everlight, are used as UV stabilizers.

ADEKA NOL UC-606 HALS UV stabilizer ("UC-606") is available from Adeka.

The following standard analytical equipment and methods are used in the Examples.

Yellowing Test

A portion of the test coating composition was applied to a vinyl chart by a 100 μm drawdown bar, and then cured at room temperature overnight. Then, b value of the resultant coating film was measured by a colorimeter (Micromatch plus model from Sheen Company) and recorded as the initial b value. Then another portion of the test coating composition was placed in an oven at 80° C. After heatage at 80° C. for several days, the coating composition was taken out and applied on a vinyl chart with a 100 μm drawdown bar, and then cured at room temperature overnight. Then b value of the obtained coating film was measured and recorded as the final b value. The delta b (Δb) value is defined as the final b value (i.e., the b value after heatage) minus the initial b value. Lower Δb value indicates less yellowing of the test coating composition.

Preparation of Latex A Binder

First, a monomer mixture was prepared by mixing 425.72 grams (g) of deionized (DI) water, 37.8 g of Fes-32 surfactant (31%), 458.46 g of MMA, 24.45 g of MAA, and 1072.94 g of EA.

Into a 1 gallon vessel, equipped with a reflux condenser, addition funnels and a stirrer, an initial water charge was added with agitation at 130 rpm. The reaction vessel was heated to 91° C. 6.21 g of Fes-32 surfactant (31%) and a solution of 4.02 g of $Na_2CO_3$ dissolved in 25.91 g of DI water were added into the vessel. Then 59.81 g of the monomer mixture, a reductant solution of 0.0168 g of ferrous sulfate and 0.0349 g of EDTA dissolved in 6.78 g of DI water, and an initiator solution of 7.22 g of SPS dissolved in 43.18 g of DI water were injected into the reaction vessel and held for 10 minutes for seed formation at 82-88° C. The remainder of the monomer mixture was added over a period of 90 minutes with temperature between 85° C. and 87° C. At 50% of monomer mixture feed, 57.93 g of AAEM was added to the monomer mixture. After completing addition of the monomer mixture, the contents in the reaction vessel were cooled to room temperature. As the reaction mixture was cooled down, a mixture of 2.45 g of t-BHP dissolved in 39.51 g of DI water and 1.98 g of FF6 dissolved in 41.95 g of DI water was added when the temperature was at 65° C. to give an emulsion polymer. When the vessel temperature reached 50° C. or lower, 16.82 g of MEA was added to adjust the pH value of the resulting aqueous polymer dispersion over 7. The obtained aqueous polymer dispersion had a solids content of 49.12% by weight and the polymer with an average particle size of 150 nm had a composition of 66.4EA/28.5MMA/3.6AAEM/1.5MAA, % by weight based on the total weight of monomers.

Preparation of Latex B Binder

First, a monomer mixture was prepared by mixing 659.62 g of DI water, 14.81 g of SLS surfactant (28%), 811.65 g of MMA, 15.50 g of MAA, and 706.26 g of BA.

Into a 1 gallon vessel, equipped with a reflux condenser, addition funnels and a stirrer, an initial water charge was added with agitation at 130 rpm. The reaction vessel was heated to 94° C. 13.73 g of SLS surfactant (28%), and a solution of 5.45 g of $Na_2CO_3$ dissolved in 24.89 g of DI water were added into the vessel. Then 54.05 g of the monomer mixture, and an initiator solution of 5.38 g of APS dissolved in 23.90 g of DI water were injected into the reaction vessel and held for 10 minutes for seed formation at 82-92° C. The remainder of the monomer mixture was added over a period of 90 minutes with temperature between 87° C. and 89° C. At 50% of monomer mixture feed, 30.97 g of MEUA was added to the monomer mixture. During addition of the monomer mixture, another shot of an initiator solution of 0.79 g of APS dissolved in 60.25 g of DI water was co-fed into the reaction vessel over the span of 90 minutes. After completing addition of the monomer mixture, the contents in the reaction vessel were cooled to room temperature. As the reaction mixture was cooled down, a mixture of 0.64 g of t-BHP dissolved in 18 g of DI water, and 1 g of IAA dissolved in 18 g of DI water was added when the temperature was at 65° C. to give an emulsion polymer. When the vessel temperature reached 50° C. or lower, a sodium hydroxide solution was added to the vessel to adjust the pH value of the resulting aqueous polymer dispersion over 7. The obtained aqueous polymer dispersion had a solids content of 48% by weight and the polymer with an average particle size of 130 nm had a composition of 45.5BA/52.5MMA/1MAA/1MEUA, % by weight based on the total weight of monomers.

Coating Compositions

Coating compositions of Examples (Exs) 1-5 and Comparative (Comp) Exs A-J were prepared, based on formulations given in Table 1, by a two-stage process. First, components in the grind stage (589.5 g in total), including water (141.5 g), Natrosol 250 HBR (2 g), NaOH (15%) (1 g), EF-406 (2 g), OROTAN 1288 (6 g), FT-100 (6 g), Nopco NXZ (1 g), Ti-Pure R-706 (220 g), Celite 499 (10 g), CC-700 (60 g), Talc-800 (60 g) and DB-80 (80 g), were mixed with a high-shear mixer under sufficient agitation (usually 1,300-1,500 rpm) to obtain a homogeneous dispersion of the pigment and the extender. After the grind stage, usually a viscous millbase was obtained. In the second letdown stage, the millbase was mixed with the letdown components as given in Table 1 for inventive coating compositions and Table 2 for comparative coating compositions, respectively, including the above prepared aqueous polymer dispersions (i.e., latex binders). Meanwhile, a low shear mixer (usually 500-700 rpm) was used to avoid foaming and unstable grits. After all components were added in the millbase and agitated for around 30 minutes, a homogeneous coating composition was obtained.

TABLE 1

Letdown Ingredients for Inventive Coating Compositions

| Raw materials | Ex 1 | Ex 2 | Ex 3 | Ex 4 | Ex 5 |
|---|---|---|---|---|---|
| | Letdown | | | | |
| Latex A, g | 330 | 330 | 330 | 330 | 330 |
| 4-hydroxyl-TEMPO (25%), g | 0.8 | 1.6 | 3.2 | 3.2 | 3.2 |
| TEXANOL, g | 13 | 13 | 13 | 13 | 13 |
| ROPAQUE Ultra E, g | 40 | 40 | 40 | 40 | 40 |
| Nopco NXZ, g | 2 | 2 | 2 | 2 | 2 |
| ACRYSOL TT-935 (50%), g | 5 | 5 | 5 | 5 | 5 |
| NaOH (15%), g | 0.5 | 0.5 | 0.5 | 0.5 | 0.5 |
| Biocide (dosage/type) | 3 g/ZPT | 3 g/ZPT | 3 g/ZPT | 1.5 g/ZPT | 1 g/CuPT |
| 2.5% MIT, g | 4 | 4 | 4 | 4 | 4 |
| 2.5% BIT, g | 4 | 4 | 4 | 4 | 4 |
| Ferric nitrate (25%), g | 0.5 | 0.5 | 0.5 | 0.5 | 0.5 |
| DB 20 (20%), g | 0.5 | 0.5 | 0.5 | 0.5 | 0.5 |
| Water, g | 7.2 | 6.4 | 4.8 | 6.3 | 6.8 |
| Total, g | 1000 | 1000 | 1000 | 1000 | 1000 |

*Total PVC of coating compositions: 52%

TABLE 2

Letdown Ingredients for Comparative Coating Compositions

| Raw materials | Comp Ex A | Comp Ex B | Comp Ex C | Comp Ex D | Comp Ex E | Comp Ex F | Comp Ex G | Comp Ex H | Comp Ex I | Comp Ex J |
|---|---|---|---|---|---|---|---|---|---|---|
| | Letdown | | | | | | | | | |
| Latex A | 330 | 330 | 330 | 330 | 330 | 330 | 330 | 330 | 330 | |
| Latex B | | | | | | | | | | 330 |
| 4-hydroxyl-TEMPO (25%), g | | | | | | | | | 0.8 | |
| TMP (25%), g | | 0.8 | | | | | | | | |
| AQ-1 (25%), g | | | 3.2 | | | | | | | |
| AQ-4 (25%), g | | | | 3.2 | | | | | | |
| UC-606 (25%), g | | | | | 3.2 | | | | | |
| TEXANOL, g | 13 | 13 | 13 | 13 | 13 | 13 | 13 | 13 | 13 | 13 |
| ROPAQUE Ultra E, g | 40 | 40 | 40 | 40 | 40 | 40 | 40 | 40 | 40 | 40 |
| Nopco NXZ, g | 2 | 2 | 2 | 2 | 2 | 2 | 2 | 2 | 2 | 2 |
| ACRYSOL TT-935 (50%), g | 5 | 5 | 5 | 5 | 5 | 5 | 5 | 5 | 5 | 5 |
| NaOH (15%), g | 0.5 | 0.5 | 0.5 | 0.5 | 0.5 | 0.5 | 0.5 | 0.5 | 0.5 | 0.5 |
| Biocide (dosage/type) | 3 g/ZPT | 3 g/ZPT | 3 g/ZPT | 3 g/ZPT | 3 g/ZPT | 1 g/CuPT | 1.5 g/ZPT | | | 3 g/ZPT |

TABLE 2-continued

Letdown Ingredients for Comparative Coating Compositions

| Raw materials | Comp Ex A | Comp Ex B | Comp Ex C | Comp Ex D | Comp Ex E | Comp Ex F | Comp Ex G | Comp Ex H | Comp Ex I | Comp Ex J |
|---|---|---|---|---|---|---|---|---|---|---|
| | | | | | Letdown | | | | | |
| 2.5% MIT, g | 4 | 4 | 4 | 4 | 4 | 4 | 4 | 4 | 4 | 4 |
| 2.5% BIT, g | 4 | 4 | 4 | 4 | 4 | 4 | 4 | 4 | 4 | 4 |
| Ferric nitrate (25%), g | 0.5 | 0.5 | 0.5 | 0.5 | 0.5 | 0.5 | 0.5 | 0.5 | 0.5 | 0.5 |
| DB 20 (20%), g | 0.5 | 0.5 | 0.5 | 0.5 | 0.5 | 0.5 | 0.5 | 0.5 | 0.5 | 0.5 |
| Water, g | 8 | 7.2 | 4.8 | 4.8 | 4.8 | 10 | 9.5 | 11 | 10.2 | 8 |
| Total, g | 1000 | 1000 | 1000 | 1000 | 1000 | 1000 | 1000 | 1000 | 1000 | 1000 |

*Total PVC of coating compositions: 52%

The above obtained aqueous coating compositions were evaluated for yellowness after heatage for different time according to the test method described above. Results are given in Table 3.

As shown in Table 3, the coating composition comprising ZPT and the acetoacetoxy functional polymer showed obvious yellowing after heatage at 80° C. for 4-10 days, as indicated by Ab values ranging from 1.1 to 2.5 (Comp Exs A and G). It is noticed that coating compositions comprising the acetoacetoxy functional polymer only (Comp Ex H) or comprising the acetoacetoxy functional polymer and 4-Hydroxy-TEMPO but no ZPT (Comp Ex I), or comprising only ZPT but no acetoacetoxy functional polymer (Comp Ex J) showed no yellowing after heatage, also as indicated by Ab as low as 0.6-0.7 even after heatage at 80° C. for 10 days.

Therefore, it indicates that yellowing was caused by the reaction product of the acetoacetoxy functional polymer and the ZPT biocide. Surprisingly, the use of 4-Hydroxy-TEMPO kept ZPT from causing color in coating compositions comprising the acetoacetoxy functional polymer (Exs 1-4). In addition, the aqueous coating composition comprising the acetoacetoxy functional polymer, CuPT and 4-Hydroxy-TEMPO (Ex 5) showed less yellowing as compared to the coating composition without 4-Hydroxy-TEMPO (Comp Ex F). In contrast, addition of TMP (Comp Ex B), AQ-1 (Comp Ex C), AQ-4 (Comp Ex D), or UC-606 (Comp Ex E) didn't help on reducing yellowing caused by reactions of ZPT and the acetoacetoxy functional polymer. The coating compositions of the present invention comprising 4-Hydroxy-TEMPO showed much better yellowing performance than coating compositions comprising other additives.

TABLE 3

Yellowing Test Results

| Coating composition | Polymer composition | | | | Ab values after heatage at 80° C. | | |
|---|---|---|---|---|---|---|---|
| | AAEM content in polymer[a] | ZPT[b] | CuPT[b] | Additive (Type/Dosage) | Ab after 4 days | Ab after 6 days | Ab after 10 days |
| Comp Ex A | 3.6% | 0.3% | | | 1.2 | 1.5 | 2.5 |
| Comp Ex B | 3.6% | | | TMP/200 ppm | | 2.2 | |
| Comp Ex C | 3.6% | | | AQ-1/800 ppm | | 1.8 | |
| Comp Ex D | 3.6% | | | AQ-4/800 ppm | | 2.7 | |
| Comp Ex E | 3.6% | | | UC-606/800 ppm | | 1.9 | |
| Comp Ex F | 3.6% | | 0.1% | | 5.1 | | 5.2 |
| Comp Ex G | 3.6% | 0.15% | | | 1.1 | | 2.5 |
| Comp Ex H | 3.6% | | | | | | 0.6 |
| Comp Ex I | 3.6% | | | 4-hydroxy-TEMPO/200 ppm | | 0.7 | |
| Comp Ex J | 0% | 0.3% | | | 0.27 | | |
| Ex 1 | 3.6% | 0.3% | | 4-hydroxy-TEMPO/200 ppm | 0 | 0.3 | 0.6 |
| Ex 2 | 3.6% | 0.3% | | 4-hydroxy-TEMPO/400 ppm | 0 | | 0.5 |
| Ex 3 | 3.6% | 0.3% | | 4-hydroxy-TEMPO/800 ppm | 0 | | 0.7 |
| Ex 4 | 3.6% | 0.15% | | 4-hydroxy-TEMPO/800 ppm | 0 | | 0.6 |
| Ex 5 | 3.6% | | 0.1% | 4-hydroxy-TEMPO/800 ppm | 0.9 | | 2.1 |

[a] by weight based on the weight of the polymer in the aqueous coating composition;
[b] by weight based on the total weight of the aqueous coating composition.

What is claimed is:

1. An aqueous polymer composition, comprising,
   (a) an acetoacetoxy functional polymer, comprising, based on the weight of the polymer, from 0.05% to 10% by weight of structural units of an acetoacetoxy functional monomer,
   (b) a metal pyrithione compound, and
   (c) from 0.005% to 1% by weight of TEMPO and/or a derivative thereof, based on the total weight of the aqueous polymer composition.

2. The aqueous polymer composition of claim 1, wherein TEMPO and/or the derivative thereof have the structure of formula (II),

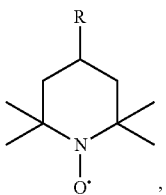

wherein R is H, —OH, an alkyl, an alkoxy, or a (hetero) aryl.

3. The aqueous polymer composition of claim 1, wherein TEMPO and/or a derivative thereof are selected from the group consisting of TEMPO, 4-hydroxy-TEMPO, 4-methyl-TEMPO, 4-methoxy-TEMPO, and 4-ethyl-TEMPO.

4. The aqueous polymer composition of claim 1, wherein the metal pyrithione compound is present in an amount of from 0.001% to 2% by weight, based on the total weight of the aqueous polymer composition.

5. The aqueous polymer composition of claim 1, wherein the metal pyrithione compound is zinc pyrithione, copper pyrithione, or a mixture thereof.

6. The aqueous polymer composition of claim 1, wherein the acetoacetoxy functional monomer is selected from the group consisting of acetoacetoxyethyl methacrylate, acetoacetoxyethyl acrylate, acetoacetoxypropyl methacrylate, allyl acetoacetate, acetoacetoxybutyl methacrylate, and 2,3-di(acetoacetoxy)propyl methacrylate.

7. The aqueous polymer composition of claim 1, comprising from 0.01% to 0.1% by weight of TEMPO and/or a derivative thereof, based on the total weight of the aqueous polymer composition.

8. A method for reducing yellowing of an aqueous coating composition comprising an acetoacetoxy functional polymer comprising, based on the weight of the polymer, from 0.05% to 10% by weight of structural units of an acetoacetoxy functional monomer, and a metal pyrithione compound, the method comprising a step of:
   adding from 0.005% to 1% by weight of TEMPO and/or a derivative thereof into the aqueous coating composition, based on the total weight of the aqueous coating composition and TEMPO and/or a derivative thereof.

* * * * *